Figure 1:
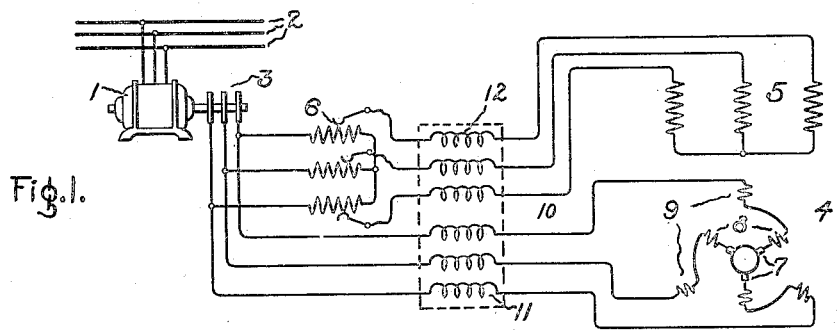

May 1, 1923.  1,453,529
W. SEIZ
COMPOUND REGULATING SET FOR INDUCTION MOTORS
Filed Nov. 30, 1921

Inventor:
Walter Seiz,
by
His Attorney

Patented May 1, 1923.

1,453,529

UNITED STATES PATENT OFFICE.

WALTER SEIZ, OF BADEN, SWITZERLAND, ASSIGNOR TO GENERAL ELECTRIC COMPANY, A CORPORATION OF NEW YORK.

COMPOUND REGULATING SET FOR INDUCTION MOTORS.

Application filed November 30, 1921. Serial No. 518,753.

*To all whom it may concern:*

Be it known that I, WALTER SEIZ, a citizen of the German Realm, residing at Baden, Switzerland, have invented certain new and useful Improvements in Compound Regulating Sets for Induction Motors, of which the following is a specification.

My invention relates to an arrangement for controlling the speed of induction motors and has for its object the provision, in connection with a system comprising an induction motor, a regulating machine concatenated therewith and an exciting system for said machine, of new and improved methods of compounding the exciting system so as to obtain stable operating characteristics at all speeds between a speed considerably below synchronism and a speed considerably above synchronism.

It is well known that the no load speed of an induction motor may be readily regulated at will between wide limits by regulating the excitation of a commutator machine connected in cascade therewith. In many cases it is desirable that the speed of the induction motor shall fall off with increasing load. This is particularly true when the set is coupled with energy storing devices for the purpose of load equalization. There are two known methods of giving the cascaded induction motor a compound characteristic. Thus it is known to introduce into the circuit of the exciting windings of the commutator machine by means of a so-called compounding transformer a voltage which depends upon the load of this machine. This method is effective at speeds of the induction motor which vary essentially from synchronous speed but is ineffective for speeds at or near synchronism. The reason for the ineffectiveness of this method at or near synchronous speeds is because the transformer effect of the compounding transformer becomes weak due to the low frequency generated in the secondary circuit of the induction motor near synchronous speeds and entirely disappears at synchronism. At low frequencies the ohmic resistance of the circuit predominates and the current in the secondary of the compounding transformer becomes negligible. This method is consequently unsatisfactory when the cascade is adjusted to give no load speeds of the induction motor near synchronism.

Another method of compounding, particularly known in the direct current art, is to provide the commutator machine with a compound exciting winding, coaxially with the usual exciting windings, the compound winding being traversed by the main secondary current of the induction motor. Such a compound winding is ineffective at speeds which differ from synchronism because then a field is introduced into the commutator machine which is dependent only on the exciting voltage, its frequency and the number of turns of the exciting winding. The ampere turns of the compound winding are then compensated for by oppositely acting ampere-turns in the exciting winding proper due to the transformer action between the two. Thus the presence of the compound winding determines only a certain distribution of current for the resultant ampere-turns without varying the field intensity to any substantial degree at speeds which differ from synchronism to any extent. The compound winding however becomes effective at synchronous speed, since then no inductive coupling with the exciting winding exists and the field is a direct current field.

According to the present invention the compounding of the commutator machine is accomplished by means of a compound winding thereon, together with a compounding transformer, which at speeds differing from synchronism introduces into the exciting winding proper of the commutator machine a supplementary exciting voltage that is proportional to the principal current and to the frequency in the rotor circuit. Such a combination insures effective compounding throughout the range of operation. It is also possible, by suitably proportioning the compounding transformer to avoid the mutual influence of the two exciting windings on the commutator machine at all speeds. To this end the compounding transformer is so designed that the supplementary exciting voltage which is introduced into the circuit of the exciting winding proper and which is proportional to the rotor current, is at every moment equal and opposite to the voltage induced in the exciting winding by the compound winding on the commutator machine so that these two voltages completely compensate each other.

Figure 2:
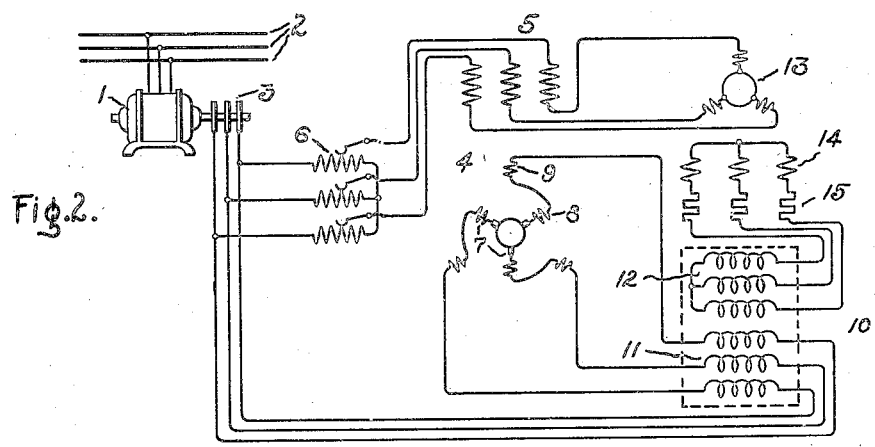
Figure 3:
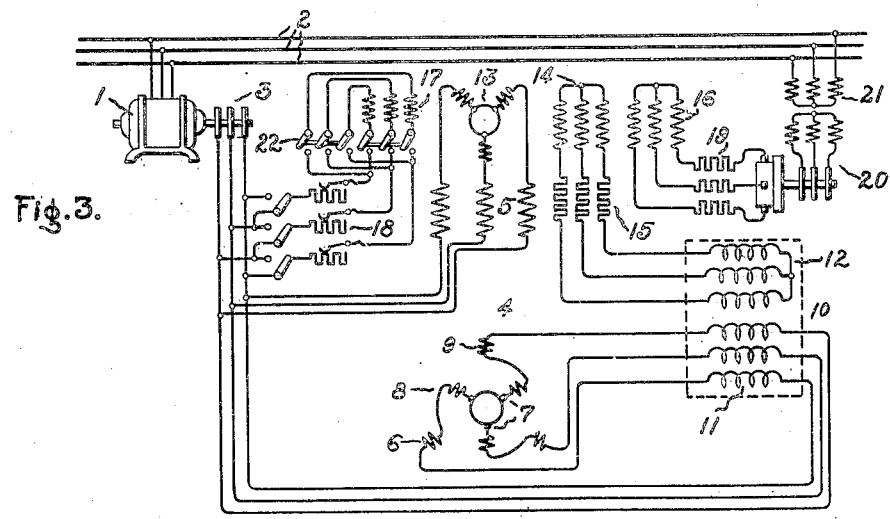

Having thus outlined the principle of operation of my invention, the scope of which will be pointed out in the appended claims, I will now proceed to explain in detail three methods, represented diagrammatically in Figs. 1, 2 and 3, of carrying my invention into effect.

Referring to Fig. 1 of the drawings, 1 indicates a wound rotor induction motor whose primary is connected to the distributing system 2 and whose secondary is connected through slip rings 3 to a commutator machine 4. The commutator machine 4 is driven at the proper speed by a motor, not shown. The exciting winding 5 of the commutator machine 4 is also connected to the collector rings 3 of the induction motor through an adjustable transformer 6. The commutator machine 4 is provided with a commutator rotor having brushes 7 which are connected in series with compensating winding 8 and a compound winding 9. 10 indicates a compounding transformer, the primary winding 11 of which is traversed by the main current in the secondary of the induction motor 1. The secondary 12 of this compounding transformer is traversed by the exciting current of the machine 4. The compounding transformer 10 is designed to induce a secondary voltage in the winding 12 which is equal and opposite in direction to the voltage induced in the exciting winding 5 by the compound winding 9 of the commutator machine 4. By this arrangement the compounding effect of the machine 4 is obtained at synchronism as well as at speeds above or below synchronism. The voltage induced in the secondary 12 of the compounding transformer at synchronous speed is zero, but at this time there is no inductive coupling between the series winding 9 and the exciting winding 5 so that the compensating effect which takes place between the windings 9 and 5 at speeds other than synchronous speed no longer exists when the induction motor is running at synchronism. It is desirable to have the compounding transformer 10 of high magnetic resistance for these conditions.

Instead of causing the compounding transformer to act directly upon the exciting circuit, it may be connected in such a manner as to supply a generator which in turn supplies the exciting windings of the commutator machine 4. In this case it will be advantageous to connect in the circuit of the exciting generator sufficient resistance to make the current furnished thereby substantially independent of the reactance of this exciting circuit.

Fig. 2 diagrammatically illustrates such an arrangement which is in other respects similar to Fig. 1 and in which like parts are designated by like numerals. In Fig. 2 the exciting winding 5 is connected between the regulating transformer 6 and an auxiliary generator 13. The generator 13 is driven at a suitable speed by a motor not shown which might to advantage be the same motor used to drive the commutator machine 4. The rotor voltage of the generator 13 is made proportional to the current and frequency of the cascade. To this end the exciting winding 14 of the auxiliary generator 13 is supplied through a resistance 15 from the secondary winding 12 of the compounding transformer 10, the primary winding 11 of which is traversed by the main current of the commutator machine 4.

In Fig. 3 I have diagrammatically represented an arrangement where an auxiliary generator such as described in connection with Fig. 2 comprises a compound generator. In Fig. 3 the auxiliary generator 13 is provided with three exciting windings 14, 16 and 17. Winding 17 is supplied through an adjustable ohmic resistance 18 from the collector rings of the induction motor 1. The winding 16 receives its current through an ohmic resistance 19 from a rotating frequency transformer 20 which is connected to the distributing system 2, and which is driven at a speed proportional to that of the motor 1 such that the secondary frequency of transformer 20 is equal to the slip frequency of motor 1. The winding 14 is supplied through ohmic resistance 15 from the secondary 12 of a series transformer 10 and its current is therefore proportional to the current and frequency of the rotor circuit of induction motor 1 which supplies the primary 11 of the series transformer 10. The voltage furnished by the exciter 13 to the exciting winding 5 of the commutator machine 4 is made up of components which at all times correspond to the three excitations of the exciter 13. The excitations of windings 17 and 16 are substantially functions of voltages. The excitation of winding 14, on the other hand, is primarily a function of the current in the induction motor rotor circuit. The exciting voltage of the winding 17 is the collector ring voltage of the induction motor 1 and is equal to zero at synchronism and therefore produces a field only when the induction motor is operating above or below synchronism. The exciting voltage of the winding 16 is determined by the voltage of the distributing system 2, assumed to be constant, and by the ratio of transformation of a transformer 21 connected in series with the frequency transformer 20. In some cases it will be advantageous to make the transformer 21 adjustable. The exciting voltage produced in winding 16 is independent of the speed of the induction motor and, therefore, produces a field which at synchronous speed, is a direct current field, in the machine 13. The exciting winding 14, which is supplied from the series transformer 10 furnished a field component which is proportional to the induction motor rotor current and frequency, but only at speeds of the induction motor which are different from synchronous speed, since at synchronism the transformer action between the windings 11 and 12 no longer exists. At synchronous speed, however, the compound winding 9 of the machine 4 becomes effective so that the machine 4, even at synchronous speed of the induction motor, has an excitation proportional to the rotor current of the induction motor as well as an excitation which is dependent upon the frequency transformer 20. The resistances 15, 18 and 19 serve for the purpose of reducing the mutual inductive influence of the windings 14, 17 and 16 of the exciter 13 to a permissible degree. In the circuits of the windings 14 and 16 the resistances are not varied and it is, therefore, possible, and may under some circumstances be advantageous, to put the two circuits together, in which case the secondary winding of the transformer 10 would be connected directly in the circuit of the winding 16, that is, in series with the frequency transformer 20, the resistance 19 and the exciting winding 16. In order to obviate the necessity of making any changes of connection in the exciting circuit of winding 14 in passing through synchronism, it is simplest to make a cyclic exchange of phases in the exciting circuit of the commutating machine 4 and to effect a reversal of the direction of the current in the exciting winding 17 by means of a reversing switch 22, Fig. 3.

The voltage at the commutator brushes of the frequency transformer 20 must, by brush shifting or primary voltage regulation, be continually so varied that it causes a voltage of the exciter 13 which is at least approximately in phase with the exciting current of the commutator machine 4 when the basic speed of the induction motor 1 is adjusted. With the arrangements described it is important for the proper operation of the machines to properly select the ratio of resistance to self inductance in the exciting circuit. If $c$ indicates the rotor frequency and $i$ the rotor current of the induction motor, then, neglecting the saturation, the voltage produced in the exciting winding 5 by the rotor current $i$ is proportional to the expression $c\,i$. According to the invention the exciter 13 must furnish the same voltage, that is, its exciting current must also be proportional to the expression $c\,i$. The voltage induced in the secondary part 12 of the series transformer 10 is likewise proportional to the expression $c\,i$. It is, therefore, seen that if a resistance 15 is connected in the circuit of the winding 14 of such magnitude that the reactance of the circuit with relation to the resistance is small that the exciting current of the auxiliary machine 13 will have the correct phase and be substantially proportional to the expression $c\,i$ for all rotor frequencies and loads. Under these conditions the main and shunt exciting circuits of the commutator machine 4 will be entirely independent of each other.

It has been assumed in the above discussion that the reactance of the exciting circuit of the winding 14 is negligibly small as compared to the ohmic resistance of this circuit. If this condition is departed from to some extent it is also possible by suitable selection of the ratio of ohmic resistance to reactance to compensate for the inductive drop of potential in the rotor circuit of the induction motor by means of a supplementary e. m. f., or, as it is said, to neutralize the rotor reactance. The reactance voltage in the rotor circuit of the induction motor is also proportional to the value $c\,i$ and, therefore, only a corresponding phase displacement of the field is necessary in order to compensate for the inductive drop of potential in the rotor circuit. This phase displacement of the field may be secured if the reactance is caused to predominate over the ohmic resistance of the exciting circuit to such an extent that, while the intensity of the exciting current is still substantially determined by the ohmic resistance, the effect of the reactance is just sufficient to give to the exciting current and therefore to the field also the desired phase displacement.

The method above described for compounding a cascade arrangement may, of course, be employed not only to increase the natural drop in speed under load but also to lessen it, or even to cause a rise of speed with increasing load.

The well-known method of regulating the speed of an induction motor above and below synchronism and through synchronism by means of a commutator machine connected to its secondary circuit has not been discussed in the present application as it forms no part of this invention, but it is evident to those skilled in the art that the applicant's invention is designed so as to be used in connection with such a system.

What I claim as new and desire to secure by Letters Patent of the United States, is,—

1. In combination a source of supply, an asynchronous motor having its primary winding connected thereto, a commutator machine connected in cascade with the secondary winding of said motor, means for exciting said commutator machine comprising inductively related exciting windings thereon, one of said windings being a series winding and means for neutralizing the inductive effect of said series winding on said other winding.

2. In combination a source of supply, an asynchronous motor having its primary winding connected thereto, a commutator machine connected in cascade with the secondary winding of said motor, inductively related shunt and series exciting windings on said commutator machine and means inductively associated with the cascade connection for neutralizing the inductive effect of said series winding on said shunt winding.

3. In combination a source of supply, an asynchronous motor having its primary winding connected thereto, a commutator machine connected in cascade with the secondary winding of said motor, a main exciting winding on said commutator machine, a series exciting winding on said commutator machine inductively related to said main winding, a compounding transformer having its primary circuit in series with the cascade connection and its secondary circuit associated with the circuit of said main winding adapted to produce in said main exciting winding an electromotive force equal and opposite to the electromotive force produced therein by the inductive effect of said series winding.

4. In combination a source of supply, an asynchronous motor having its primary winding connected thereto, means for regulating the speed of said motor comprising a commutator machine connected in cascade to the secondary windings of said motor, inductively related main and series exciting windings on said commutator machine, means for varying the current flowing in said main winding for varying the speed of said motor from sub-synchronous speed to super-synchronous speed and vice versa and means for introducing into said main exciting winding an electromotive force equal and opposite to the electromotive force induced in said main winding by the inductive effect of said series winding at speeds other than synchronism.

5. The method of compounding a cascade consisting of an induction motor and a commutator machine connected to the secondary windings of said motor, said commutator machine having main and series exciting windings, which consists in exciting said series winding by the rotor current of said machine, exciting the main winding by a current adapted to produce in said commutator machine the desired main excitation and which has a component adapted to oppose and neutralize the current induced in said main winding by said series winding.

6. In combination a source of supply, an asynchronous motor having its primary winding connected thereto, a commutator machine connected in cascade with the secondary winding of said motor, main and series exciting windings on said commutator machine, an exciter connected to said main winding, an exciting winding for said exciter and means for exciting said last mentioned winding by a current which is proportional to the current and frequency in said secondary winding.

7. In combination a source of supply, an asynchronous motor having its primary winding connected thereto, a commutator machine connected in cascade with the secondary windings of said motor, main and series exciting windings for said commutator machine, an exciter connected in the circuit of said main exciting winding, an exciting winding on said exciter, means associated with the circuit of the last mentioned winding for producing therein a current proportional to the current and frequency in the secondary of said motor and which is substantially independent of the reactance of said last mentioned circuit.

8. In combination a source of supply, an asynchronous motor having its primary supplied thereby, a commutator machine connected in cascade with the secondary winding of said motor, main and series exciting windings on said commutator machine, a generator for supplying current to said main winding, an exciting circuit for said generator, means for producing therein a current which is proportional to the frequency and current in said series exciting winding, the ratio of ohmic resistance to reactance in the exciting circuit of said generator being such that the magnitude of the current produced therein is substantially independent of the reactance and has a lagging component sufficient to neutralize in the commutator machine the inductive drop in the secondary circuit of said asynchronous motor.

In witness whereof, I have hereunto set my hand this 10th day of November, 1921.

WALTER SEIZ.